W. L. PAUL.
PLOW.
APPLICATION FILED JAN. 23, 1911.
1,022,256.
Patented Apr. 2, 1912.
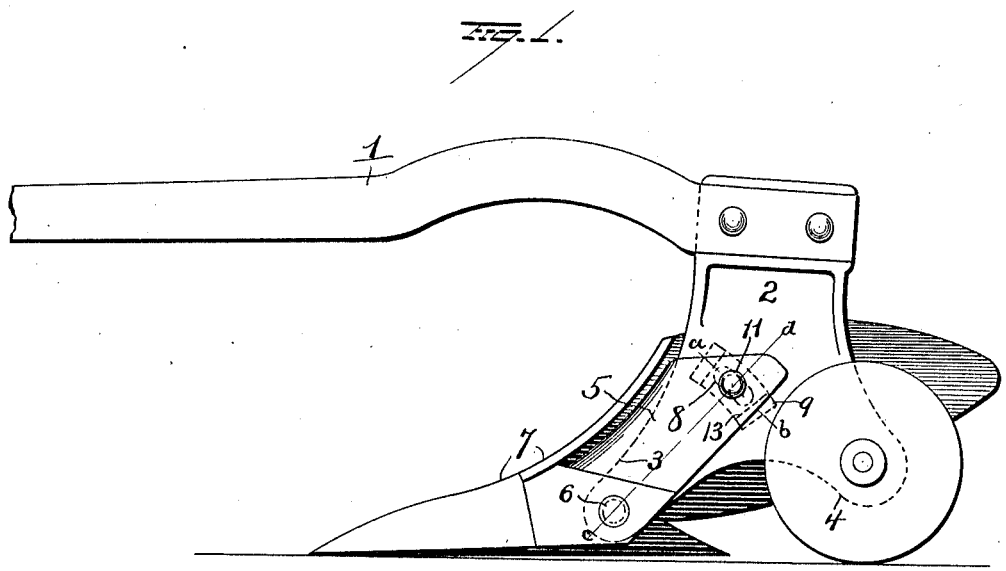
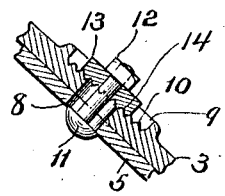
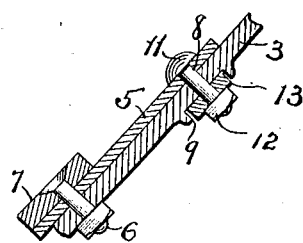
WITNESSES
E. J. Nottingham
G. J. Downing
INVENTOR
W. L. Paul
By H. A. Seymour
Attorney

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

PLOW.

1,022,256.  Specification of Letters Patent.  Patented Apr. 2, 1912.

Application filed January 23, 1911. Serial No. 604,200.

*To all whom it may concern:*

Be it known that I, WILLIAM L. PAUL, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to an improvement in plows, the object of the invention being to so construct a plow structure that the "plow bottom" or soil engaging member can be adjusted bodily with respect to the standard in such manner as to vary the "suction," by adjusting the angular relation of the "plow bottom" to the line of draft to suit various conditions of the soil and also to accommodate variations in manufacture.

With this object in view the invention consists in certain novel features of construction and combinations of parts as hereinafter set forth and pointed out in the claims.

In the accompanying drawings, Figure 1 is a side elevation of a plow embodying my improvements. Fig. 2 is a section on the line *a—b* of Fig. 1, and Fig. 3 is a section on the line *c—d* of Fig. 1.

1 represents a plow beam, to the rear end of which the upper end of a standard 2 is secured. This standard is made with a member 3 which projects downwardly and somewhat forwardly and also with a downwardly and rearwardly projecting member 4. The lower end of a frog 5 is pivotally attached at 6 to the downwardly and forwardly projecting member 3 of the standard and this frog carries a "plow bottom" 7 consisting of a mold-board, share and landside of any preferred form of construction.

The frog 5 projects upwardly a distance somewhat beyond an elongated slot 8 in the standard 2 and this slot communicates with a socket or recess 9 in one face of said standard, the bottom of this socket or recess having teeth or corrugations 10 therein for a purpose presently explained. A bolt 11 passes through a suitable hole in the upper portion of the frog 5 and also through the elongated slot 8 in the standard 2, said bolt being of sufficient length to extend beyond the socket 9 in said standard. The free end of the bolt 11 is threaded for the reception of a nut 12. The bolt 11 passes through a hole in a washer 13 disposed between the nut 12 and the bottom of the socket 9, said washer having teeth or corrugations 14 to mesh with the teeth or corrugations in the bottom of the socket 9.

It will be apparent that with my improvements, the plow bottom can be adjusted by turning it upon its pivotal connection at 6 with the standard 2, in such manner as to adjust or regulate the angular relation of said "plow bottom" to the line of draft so as to accommodate the plow to the condition of the soil to be worked or to any variations in manufacture of the plow structure, which might exist. When the proper adjustment shall have been made the "plow bottom" can be rigidly locked to the standard by tightening the nut 12 and thus securing the frog to the standard with the teeth of the washer 13 intermeshing with the teeth in the bottom of the socket 9 of the standard.

The rearwardly projecting member 4 serves to support the journal of a suitable furrow wheel 15.

Having fully described my invention what I claim as new and desire to secure by Letters-Patent, is,—

1. The combination with a standard having forwardly and rearwardly projecting parts at its lower end, of a frog pivoted to the forwardly projecting part of the standard, soil-engaging parts secured to said frog, means adjustably connecting the frog with the intermediate portion of the standard, and a wheel having a mounting in the rearwardly projecting part at the lower end of the standard.

2. The combination of a frog, soil engaging parts including a mold board, carried by said frog, a standard disposed between the frog and mold-board and pivoted at its lower end to the frog, and means adjustably connecting the upper portion of said frog to the standard.

In testimony whereof, I have signed this specification in the presence of two subscribing witnesses.

WILLIAM L. PAUL.

Witnesses:
EDWIN NICAR,
EIVIRD O. BOE.

Copies of this patent may be obtained for five cents each, by addressing the "Commissioner of Patents, Washington, D. C."